United States Patent [19]

Larson

[11] Patent Number: 4,558,149
[45] Date of Patent: Dec. 10, 1985

[54] SULFONATE-CONTAINING PHOTOPOLYMER SYSTEMS

[75] Inventor: Wayne K. Larson, Maplewood, Minn.

[73] Assignee: Minnesota Mining and Manufacturing Company, St. Paul, Minn.

[21] Appl. No.: 562,459

[22] Filed: Dec. 16, 1983

[51] Int. Cl.$^4$ .......................................... C07C 143/525
[52] U.S. Cl. ..................................... 560/14; 526/258; 526/287; 528/75; 560/25; 560/26; 428/423.1; 428/423.7
[58] Field of Search ............... 528/75; 526/323.1, 287; 560/14, 26, 148

[56] References Cited

U.S. PATENT DOCUMENTS

| | | | |
|---|---|---|---|
| 2,845,402 | 7/1958 | Woodruff | 260/75 |
| 4,073,777 | 2/1978 | O'Neill et al. | 260/75 |
| 4,304,923 | 12/1981 | Rousseau | 560/26 |
| 4,309,560 | 1/1982 | Aoki | 560/14 |
| 4,321,404 | 3/1982 | Williams | 560/115 |

Primary Examiner—Christopher A. Henderson
Attorney, Agent, or Firm—Donald M. Sell; James A. Smith; Lorraine R. Sherman

[57] ABSTRACT

A low molecular weight, film-forming, polymerizable, ethylenically-unsaturated compound is water- and organic solvent-soluble (i.e., soluble in both water and organic solvents) but is readily converted on exposure to actinic radiation to a polymer that is solvent-insoluble (i.e., not soluble in water, organic solvents, or mixtures of water and organic solvents) and, in certain examples, is hydrophobic. The compound comprises the ethylenically-unsaturated derivative (i.e., an ester or an amide) of a sulfopolyol or sulfopolyamine having an ethylenic unsaturated functionality of 2 to 18 and an equivalent weight per ethylenic unsaturated functionality of less than 2500.

11 Claims, No Drawings

SULFONATE-CONTAINING PHOTOPOLYMER SYSTEMS

TECHNICAL FIELD

This invention relates to a water- and organic solvent-soluble compound which is an ethylenically-unsaturated derivative of a sulfopolyol or sulfopolyamine which on exposure to energy is converted to a water- and organic solvent-insoluble polymer. In another aspect, the invention relates to a substrate bearing a layer of water- and solvent-soluble sulfocompound. In a further aspect, the invention relates to a substrate bearing a layer of the polymer of the sulfocompound.

BACKGROUND ART

Water-soluble polyesters which are curable to insoluble resins on exposure to heat or radiation are known. U.S. Pat. No. 2,845,402 discloses polyesters that on heating in the presence of a catalyst cure to insoluble resins and that are the reaction products of polyalkyleneoxide polyols and dicarboxylic acids. U.S. Pat. No. 4,073,777 discloses polyesters and polyesteramides that crosslink to water-insoluble resins on exposure to radiation and that are the reaction products of (1) at least one dicarboxylic acid, (2) at least one glycol, (3) sufficient sulfoaromatic dicarboxylic acid, dihydroxy, or diamino compound to provide water dispersibility to the reaction product, and (4) an unsaturated mono or dicarboxylic acid.

The water-soluble polyesters described in the above cited patents, although convertible on exposure to actinic radiation to water-insoluble resins, are high molecular weight compounds that are prepared by high temperature reactions requiring the heating of unsaturated reactants to temperatures of about 270° C. for long periods of time. Such high molecular weight compounds have a high melt viscosity that adds to the difficulties encountered in handling the compounds. Also, because of the harsh and prolonged heating required in their preparation, the ethylenic unsaturation does not always survive.

SUMMARY OF THE INVENTION

The present invention provides a low molecular weight (i.e., less than 6500), film-forming, polymerizable, ethylenically-unsaturated sulfocompound that is hydrophilic and solvent-soluble (i.e., soluble in both water and organic solvents) but is readily converted on exposure to actinic radiation to a polymer that is solvent-insoluble (i.e., not soluble in water, organic solvents, or mixtures of water and organic solvents) and, in certain examples, is hydrophobic. Briefly, the sulfocompound is the poly(ethylenically-unsaturated ester or amide) of sulfopolyol or sulfopolyamine comprising the reaction product of one mole of a sulfodicarboxylic acid and two moles of an aliphatic polyether- or polyester-polyol or polyamine having a molecular weight of less than 1000 and two to four hydroxyl or amine groups, the sulfocompound having an ethylenic unsaturated functionality of 2 to 18 and an equivalent weight per ethylenic unsaturated functionality of less than 2500.

DETAILED DESCRIPTION OF THE INVENTION

Preferably, the sulfocompound of the invention comprises the reaction product of:

1. a sulfopolyol or a sulfopolyamine which is the reaction product of
   (a) one mole of a sulfodicarboxylic acid and
   (b) about two moles (e.g., 1.95 to 2.05 moles) of an aliphatic polyol or polyamine (i.e., a compound in which the structure to which two or more hydroxyl or amine groups are attached is a saturated linear chain of up to about 55 carbon atoms in units of 2 to 12 —$CH_2$— groups separated by 0 to 22 —O— atoms and 0 to 8

groups), the polyol and polyamine having a molecular weight of less than 1000 and (c+1) hydroxyl or amino groups (in which c is an integer of 1, 2, or 3); and
2. 2 c moles of either a), b), or c), in which
   (a) is a compound selected from
   (i) acrylic and methacrylic acid (including their esters and acid halides);
   (ii) 2-alkenylazlactones having the formula

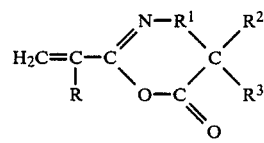

wherein
   R is hydrogen or methyl;
   $R^1$ is a covalent bond, —$CH_2$— or —$CH_2CH_2$—,
   $R^2$ and $R^3$ are independently hydrogen or methyl; and
   (iii) ethylenically-unsaturated isocyanates having the formula

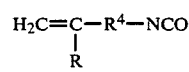

wherein
   $R_4$ is a covalent bond, —$CH_2$—,

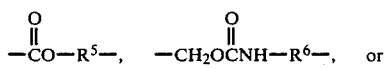

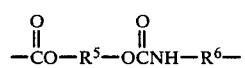

wherein
   $R^5$ is a linear or branched chain of 1 to 12 carbon atoms optionally containing one nonperoxidic catenary oxygen atom or

group or $R^5$ is a 5- or 6-membered carbocyclic group optionally substituted by lower alkyl groups having 1 to 4 carbon atoms, the carbocyclic group having a total of up to 12 carbon atoms, and R⁶ is an organic group selected from linear or branched alkylene groups having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally substituted by up to four lower alkyl groups having 1 to 4 carbon atoms and a total of up to 15 carbon atoms; or (b) diisocyanate having the formula

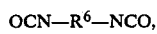   III the reaction product of said sulfopolyester polyol and said diisocyanate then being reacted with 2 c moles of an ethylenically-unsaturated alcohol having the formula

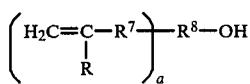   IV wherein
R and R⁶ are as defined above;
R⁷ is a

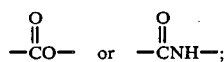

R⁸ is a polyvalent aliphatic group selected from linear and branched alkyl groups having a valence of (a+1), 2 to 12 carbon atoms, no or one nonperoxidic catenary oxygen atom, and no or one

group, and alicyclic groups having a 5- or 6-atom carbocyclic structure optionally substituted by up to 4 lower alkyl groups having 1 to 4 carbon atoms and a total of up to 12 carbon atoms, and preferably the polyvalent group is selected from

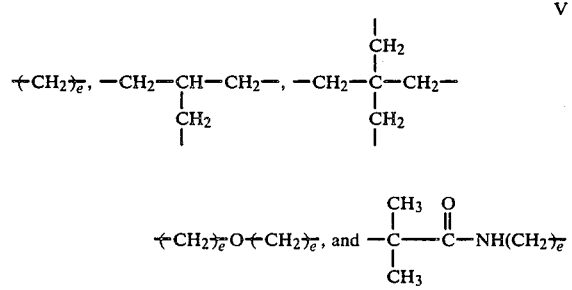   V in which e is an integer of 1 to 6 inclusively; and a is an integer of 1, 2, or 3; or (c) the reaction product of one mole of organic diisocyanate of Formula III and one mole of an ethylenically-unsaturated alcohol of Formula IV; there being essentially no (i.e., less than 0.5 weight percent) hydroxyl, amino, or isocyanate groups remaining after the reaction of 1. with either 2(a), 2(b), or 2(c).

Preferably, the low molecular weight, film-forming, polymerizable, ethylenically-unsaturated sulfocompound has an equivalent weight per ethylenic unsaturated functionality of about 300 to 1000. As the unsaturated functionality is increased above about 600, the polymer becomes increasingly hydrophilic and as the functionality is decreased below about 600, the polymer becomes increasingly hydrophobic.

There is also provided by the invention energy-curable coating compositions comprising the hydrophilic, water- and organic solvent-soluble, polymerizable, ethylenically-unsaturated sulfocompound in a solvent (preferably water), and optionally a free radical source. Furthermore, there are provided substrates bearing a layer comprising the preferable hydrophilic, water- and organic solvent-soluble polymerizable ethylenically-unsaturated sulfocompound of a sulfopolyester polyol or polyamine and, also, substrates bearing a layer of the polymerized ethylenically-unsaturated sulfocompound of a sulfopolyester polyol or polyamine.

As used in this application:

"poly(ethylenically-unsaturated ester or amide)" means an organic compound having an ethylenically-unsaturated group (i.e., H₂C=CH— or H₂C=C(CH₃)—) that is connected to the compound by means of at least one of a bond, a methylene group,

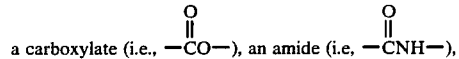

or a carbamate group (also called urethane group, i.e.,

"low molecular weight ester" means a compound that is the ethylenically-unsaturated derivative of a sulfoester that is the reaction product of one mole of a sulfodicarboxylic acid and no more than two moles of polyol or polyamine having 2 to 4 hydroxyl or amino groups followed by reaction with 2 to 6 moles of an ethylenically-unsaturated compound. The compound therefore, has only one sulfo group and generally has a molecular weight of less than 6500, and preferably less than 4000;

"lower alkyl" means 1 to 4 carbon atoms;

"catenary" means in the main chain or backbone and not in a pendent or terminal group.

"sulfo" means a —SO₃H group or a salt thereof; and

"sulfocompound" means a water- and organic solvent-soluble compound which is an ethylenically-unsaturated derivative (i.e., an ester or an amide) of a sulfopolyol or sulfopolyamine. The water- and organic solvent-soluble, low molecular weight, film-forming, polymerizable, ethylenically-unsaturated sulfocompounds of the invention preferably have the general formulas

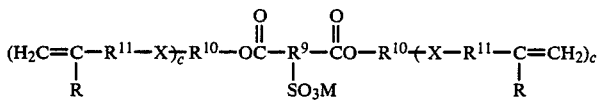

$$(H_2C=\underset{R}{\overset{}{C}}-R^{11}-X)_{\overline{c}}R^{10}-O\overset{O}{\overset{\|}{C}}-\underset{SO_3M}{\overset{}{R^9}}-\overset{O}{\overset{\|}{C}}O-R^{10}\text{+}X-\underset{R}{\overset{}{R^{11}}}-C=CH_2)_c$$

and

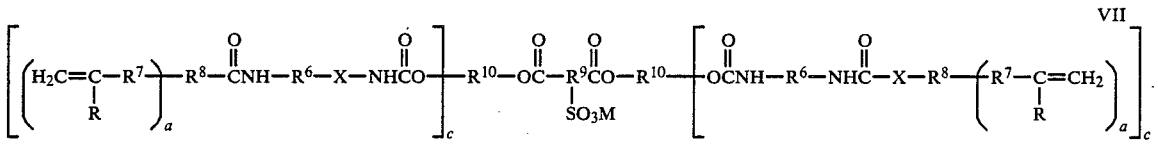

wherein:

R, $R^6$, $R^7$, $R^8$, and c are defined above;

$R^9$ is an arenetriyl group (trivalent arene group) having 6 to 12 carbon atoms or an alkanetriyl (trivalent alkane group) group having 2 to 12 carbon atoms remaining after the removal of carboxyl and sulfo groups from sulfoarene- and sulfoalkane dicarboxylic acids having the formula

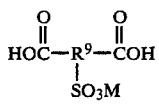

in which M is a cation, and preferably M is Na, but M can be H, K, Li, an alkaline earth metal cation (e.g., Mg, Ca, or Ba), or a primary, secondary, tertiary, or quaternary ammonium cation such as ammonium, methylammonium, butylammonium, diethylammonium, triethylammonium, tetraethylammonium, and benzyltrimethylammonium cation;

$R^{10}$ is a linear aliphatic group having a valence of (c+1) consisting of a saturated chain of up to about 55 carbon atoms in units of 2 to 12 —CH$_2$— groups separated by 0 to 22 —O— atoms and 0 to 8

groups, the aliphatic group having a molecular weight of less than 1000, wherein c is an integer of 1, 2, or 3; $R^{11}$ is

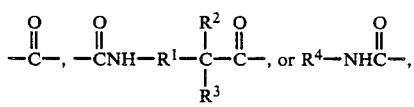

in which $R^1$, $R^2$, $R^3$, and $R^4$ are as defined above;

X is —O— or —NH—; and a is an integer of 1, 2, or 3.

The coating compositions of the invention are energy-curable and preferably comprise the low molecular weight, solvent-soluble, film-forming, polymerizable urethane group-containing compounds of Formulas VI and VII and a free radical generating compound that generates free radicals on application of energy.

The low molecular weight, water- and organic solvent-soluble, film-forming, polymerizable sulfocompound of the invention can be prepared by procedures well known in the art, preferably by the reaction of one mole of sulfoarene or sulfoalkane dicarboxylic acid, Formula VIII, (or their esters prepared from an alcohol of low molecular weight, i.e. below about 94, their acid anhydrides, or their acid halides) with essentially two moles of aliphatic monomeric or polymeric polyol having (c+1) hydroxyl or amino groups forming a sulfopolyol or sulfopolyamine having 2 c hydroxyl or amino groups, whether c is an integer of 1, 2, or 3. The sulfopolyol or sulfopolyamine is then caused to react with either: (a) (i) 2 c moles of an acrylic or methacrylic acid, ester or acid halide, or (ii) with an ethenyl azlactone, or (iii) with 2 c moles of an ethylenically- unsaturated isocyanate, preferably an isocyanatoalkyl acrylate or polyacrylate, (b) 2 c moles of an organic diisocyanate followed by reaction with 2 c moles of an ethylenically-unsaturated alcohol, preferably a hydroxyalkyl acrylate, or (c) 2 c moles of the reaction product of one mole of organic diisocyanate with one mole of an ethylenically-unsaturated alcohol, preferably a hydroxyalkyl acrylate. As is known in the art, these reactions can be performed in the presence of a mercury, lead or tin catalyst such as dibutyltin dilaurate. Preferably, the catalyst is a tertiary amine, tricalcium aluminate, or the potassium salt of a molybdenum ester of triethyleneglycol as is disclosed in U.S. Pat. No. 2,916,464. The preparation of the sulfopolyol or sulfopolyamine can be carried out by heating the reactants for about 2 to 20 hours, preferably 4 to 10 hours, at temperatures from 150° to 300° C., preferably 200° to 250° C., under reduced pressure or an inert atmosphere. Reactions in which one of the components is an acrylic group-containing compound need be heated at a temperature of only about 20 to 100° C., preferably 30 to 60° C. for 1 to 10 hours.

Aliphatic polyols, (HO)$_c$R$^{10}$—OH, useful in preparing the water- and organic solvent-soluble sulfocompounds of the invention have a molecular weight of 62 to 1000 and include, for example, monomeric and polymeric polyols having two to four hydroxyl groups. Examples of the monomeric polyols include ethylene glycol, propylene glycol, butylene glycol, hexamethylene glycol, 1,1,1-trimethylolpropane, pentaerythritol, and the like. Examples of polymeric polyols include the polyoxyalkylene polyols, i.e., the diols, triols, and tetrols, the polyester diols, triols, and tetrols of organic dicarboxylic acids and polyhydric alcohols, and the polylactone diols, triols, and tetrols having a molecular weight of 106 to about 1000. Examples of polymeric polyols include polyoxyethylene diols, triols and tetrols such as the Carbowax TM polyols available from Union Carbide, the polyoxytetramethylenediols such as Polymeg TM polyols available from Quaker Oats Company, the polyester polyols such as the Multron TM poly(ethyleneadipate)polyols available from Mobay Chemical Company, and the polycaprolactone polyols such as the PCP TM polyols available from Union Carbide.

Aliphatic polyamines $(H_2N)_cR^{10}$—OH, useful in preparing the sulfocompounds of the invention are the polyamines available from Jefferson Chemical Co., Inc., a subsidiary of Texaco, Inc., under the tradename Jeffamine TM such as Jeffamine TM D-400, a polyoxypropylene diamine having a molecular weight of about 400; Jeffamine TM D-230, a polyoxypropylene diamine having a molecular weight of about 230; Jeffamine TM T-403, a polyoxypropylene triamine having a molecular weight of about 400; and Jeffamine TM ED 600 and ED 900, which are polyoxyethylene diamines having molecular weights of 600 and 900, respectively.

Sulfoarene- and sulfoalkanedicarboxylic acids of Formula VIII useful for preparation of the water- and solvent-soluble sulfocompounds of the invention are any of the known sulfoarene- and sulfoalkanedicarboxylic acids. Examples of these include sulfoalkanedicarboxylic acids such as sulfosuccinic acid, 2-sulfoglutaric acid, 3-sulfoglutaric acid and 2-sulfododecanedioic acid; sulfoarenedicarboxylic acids such as 5-sulfoisophthalic acid, 2-sulfoterephthalic acid, 5-sulfonaphthalene-1,4-dicarboxylic acid; sulfobenzylmalonic acids such as those described in U.S. Pat. No. 3,821,281; and sulfofluorenedicarboxylic acids such as 9,9-di(2'-carboxyethyl)fluorene-2-sulfonic acid described in British Patent No. 1,006,579. It is to be understood that the corresponding lower alkyl esters, halides, anhydrides, and salts of the above sulfonic acids can also be used in the preparation.

Acrylic and methacrylic acids, their esters and acid halides that can be used to prepare the ethylenically-unsaturated carboxylate esters of the invention are well known and include acrylic and methacrylic acid, the esters of low molecular weight alcohols, such as methyl, ethyl, propyl and butyl acrylate and methacrylate, and the acid halides such as acrylchloride and methacrylchloride.

2-Alkenylazlactones, compounds of Formula I, which can be caused to react with sulfopolyols and sulfopolyamines to form the ethenically-unsaturated compounds of the invention are ethylenically-unsaturated compounds having a reactivity similar to the isocyanates for reaction with a nucleophilic group. Examples of 2-alkenylazlactones include 2-ethenyl-1,3-oxazolin-5-one, 2-isopropenyl-1,3-oxazolin-5-one, 2-ethenyl-4,4-dimethyl-1,3-oxazolin-5-one, 2-isopropenyl-4,4-dimethyl-1,3-oxazolin-5-one, 2-ethenyl-5,6-dihydro-5,5-dimethyl-4H-1,3-oxazin-6-one, and 2-isopropenyl-5,6-dihydro-5,5-dimethyl-4H-1,3-oxazin-6-one. The reaction with the sulfopolyol is performed at 0° C. to 50° C. under atmospheric pressure in the presence of about 0.1 to 5 percent by weight of a Lewis acid such as $BF_3$-etherate, $AlCl_3$, or $SnCl_4$, as catalyst. The reaction with the sulfopolyamine is relatively rapid and is accompanied by a mild exotherm and generally does not require a catalyst. Other 2-alkenylazlactones and conditions that can be used are described in assignee's copending patent application Ser. No. 316,234, filed Oct. 29, 1981, which is incorporated herein by reference.

Ethylenically-unsaturated isocyanates of Formula II useful in preparing the ethylenically-unsaturated sulfocompounds of the invention include 2-isocyanatoethyl acrylate and methacrylate, 3-isocyanatopropyl acrylate and methacrylate, 2-acrylamidoethylisocyanate, 3-acrylamidopropylisocyanate, 3-methacrylamidopropylisocyanate, 2,3-bis(acryloyloxy)-propylisocyanate 3,3,3-tris(acryloyloxymethyl)-propylisocyanate, 4-methacryloyloxycyclohexylisocyanate, 5-acryloyloxymethyl-3,3, 5-trimethylcyclohexylisocyanate, allylisocyanate, methallylisocyanate, and the reaction product of the hydroxyalkyl acrylates and diisocyanates given below.

Ethylenically-unsaturated alcohols of Formula IV useful in preparing the ethylenically-unsaturated sulfocompounds of the invention are allyl and methallyl alcohols, 2-hydroxyethyl acrylate and methacrylate, 3-hydroxypropyl acrylate and methacrylate, 1,1,1-trimethylolpropane diacrylate, and dimethacrylate pentaerythritol triacrylate and trimethacrylate.

Hydroxyalkyl acrylates or methacrylates that can be reacted with an organic diisocyanate to form isocyanatoacrylates and methacrylates are well known and described in many patents, such, as for example U.S. Pat. No. 4,108,840, col. 8, lines 24-51. Especially preferred of these compounds are 2-hydroxyethyl acrylate and 3-hydroxypropyl acrylate. Other preferred hydroxyalkyl acrylates are 2,2,2-tris(acryloyloxymethyl)ethanol and 2,3-di(acryloyloxy)propanol.

Diisocyanates, Formula III, that can be used to react with the hydroxyalkyl acrylates and methacrylates to form isocyanatoacrylates and methacrylates are any of the well-known diisocyanates. Preferred diisocyanates are hexamethylene diisocyanate, toluene diisocyanate, and isophorone diisocyanate.

The coating composition of the invention may be prepared by dissolving the polymerizable ethylenically-unsaturated sulfocompound in a suitable solvent. Water, aqueous-organic solvent, or an organic solvent can be used. Generally, from 0.05 to 20 parts, preferably 0.2 to 4 parts, of solvent, preferably water, are used per part ethylenically-unsaturated sulfocompound. Examples of solvents that can be used include acetone, methyl ethyl ketone, methanol, aqueous methanol, aqueous ethanol, trichloroethylene, toluene, and the like. Other preferred solvents are the reactive solvents that are ethylenically-unsaturated and are copolymerizable with the ethylenically-unsaturated sulfocompound of the invention. Particularly preferred reactive solvents are the acrylic and methacrylic acid esters such as, for example, ethyl acrylate, butyl acrylate, n-octyl acrylate, allyl acrylate, cyclohexyl acrylate, N-methylcarbamoyloxyethyl acrylate, neopentylglycol diacrylate, 1,6-hexanediol diacrylate, pentaerythritol tetraacrylate, 1,3,5-tri(2-acryloyloxyethyl)isocyanurate, and the corresponding methacrylates.

Depending on the particular application of the coating composition it may be desirable to include in the composition conventional antioxidants, thermal stabilizers or free radical inhibitors in order to prolong storage life of the composition. Examples of such materials are butylated hydroxyanisole (BHA) and butylated hydroxytoluene (BHT) commercially available as Ionox TM 220 (Shell), Santonox TM R (Monsanto), Irganox TM 1010 (Ciba-Geigy), etc. Generally, from 0.01 to 5.0 percent by weight of the total weight of the coating composition can be used.

The properties of the coatings can be further modified by including in the coating composition a variety of adjuvants utilized for their known purpose, such as lubricants, plasticizers (e.g., dibutyl phthalate), tackifying resins (e.g., the copolymer of styrene and α-methylstyrene), inorganic thickeners, fillers (e.g., organic and inorganic particles, fibers, and flakes), pigments, and dyes. Fillers can generally be used in proportions up to about 200 parts by weight per 100 parts by weight of copolymerizable components of the coating composition. When insoluble components are desired in the coating composition, it may be necessary to use conventional high speed dispersing apparatus such as paint mills, ball mills, and the like.

Free radical generating compounds that can be used in the coating composition of the invention for effecting the conversion, on exposure to energy, of coatings prepared from the composition having ethylenically-unsaturated terminal groups, from a solvent-soluble, hydrophilic state to a solvent-insoluble, hydrophobic state, are materials known in the art. Particularly suitable free radical generating compounds include, for example, organic peroxides, azo compounds, aromatic diazonium salts, aromatic iodonium salts, aromatic sulfonium salts, aromatic phosphonium salts, quinones, benzophenones, nitroso compounds, acyl halides, aryl halides, hydrazones, mercapto compounds, pyrrylium compounds, triarylimidazoles, biimidazoles, and chloroalkyltriazines. These materials, in general, must have photosensitizers therewith to form a photoinitiator system useful with radiation above about 400 nm. Photosensitizers, such as spectrally absorbing dyes, are well known in the art. Generally, the free radical generating compound is used at a concentration of 0.01 to 10 percent, preferably 0.05 to 5 percent, by weight of the total weight of the coating composition and the photosensitizer is used at a concentration of 10 percent to 100 percent by weight of the weight of the free radical generating compound.

Additional reference in the art to free radical photoinitiator systems for ethylenically-unsaturated compounds are included in U.S. Pat. No. 3,887,450 (e.g., col. 4), U.S. Pat. No. 3,895,949 (e.g., col. 7), and U.S. Pat. No. 4,043,819. Preferred initiators are the onium salts as disclosed in U.S. Pat. Nos. 3,729,313; 4,058,400 and 4,058,401. Other desirable initiators are biimidazoles (disclosed in U.S. Pat. No. 4,090,877) and chloroalkyltriazines as disclosed in U.S. Pat. No. 3,775,113. These references also disclose sensitizers therein. Another good reference to photoinitiator systems is *Light-Sensitive Systems*, J. Kosar, J. Wiley and Sons, Inc. (1965), especially Chapter 5.

The energy-curable compositions can be used to form crosslinked, adherent, abrasion-resistant coatings on substrates using substantially any technique known in the art including spraying, curtain coating, direct or reverse roll coating, dipping, brushing, extruding, and printing. However applied, the coating is allowed to dry to remove non-copolymerizable solvent, where used, and leave a hard tack-free coating that in the absence of applied energy, particularly actinic, remains soluble and can be removed from the substrate by treatment with a solvent, particularly water or an aqueous solvent such as aqueous methanol. The dried coating can be crosslinked by exposure to radiation for a sufficient time and intensity which may vary from about ten seconds to ten minutes or more depending on the thickness and particular composition of the coating.

Substrates which may be coated with the crosslinkable compositions of the invention include organic substrates of wood, fiberboard, particle board, paper, and cardboard; synthetic and natural polymers such as polyesters, polyamides, cured phenolics, urea-aldehyde resins, poly(vinyl halides), polyacrylates, polyurethanes, proteins, rubber; inorganic substrates such as iron, stainless steel, copper, brass, bronze, aluminum, titanium, nickel, zinc, and alloys. Particularly useful substrates are silicated aluminum and the polyesters such as polyethyleneterephthalate and poly(vinyl chloride).

The energy-curable coatings of the invention can have a thickness ranging from about 0.01 $\mu$m to about 10.0 mm or more, preferably 0.1 to 1.0 mm.

Suitable radiation for use in the crosslinking the coatings of the invention and rendering them insoluble include radiation at wavelengths in the 200 to 600 nm range, preferably 200 to 450 nm. Suitable sources include sunlight, carbon arcs, mercury-vapor arcs, black light lamps, fluorescent lamps, argon and xenon glow lamps, electronic flash units, and photographic flood lamps. Electron accelerators and electron beam sources may also be used.

The energy-curable coating compositions of the invention, particularly when coated onto a substrate, are suitable for use in the graphic arts for the recording of information, e.g., color separation images, in printing plates and for use in the production of resist images, e.g., printed circuits.

Objects and advantages of this invention are further illustrated by the following examples, but the particular materials and amounts thereof recited in these examples, as well as other conditions and details, should not be construed to unduly limit this invention.

EXAMPLE 1

Illustrating the preparation of a sulfopolyester urethane acrylate

Into a one liter 3-neck flask equipped with a mechanical stirrer, reflux condenser and drying tube, thermometer, and oil bath with temperature control, 130 g (0.1 mole) Sulfoester Polyol A (prepared as described below), was added to 50 g (0.2 mole) bis(4-isocyanatophenyl)methane, 0.03 g dibutyltin dilaurate, and 150 g methyl ethyl ketone. As stirring was initiated, the temperature began to rise. Additional heat was applied to raise the temperature of the contents of the flask to 60° C. where it was held for 4 hours. There was then added 65 g pentaerythritol triacrylate and 500 ppm (with respect to the acrylate) of p-methoxy phenol. Stirring and heating was continued for an additional 4 hours at 60° C. The polymer was readily soluble in water from which it could be coated as a film and dried to a non-tacky coating that could be redissolved in water, sodium hydroxide solution, methanol, aqueous methanol, acetone, methylene chloride and other common organic solvents. The dried film had a calculated average molecular weight of 2400 and an acrylic group equivalent weight of about 400.

A cleaned copper sheet was coated with a solution of 20 g of the above-described carbamate acrylate of Sulfoester Polyol A (designated Carbamate Acrylate I) and 0.2 g of benzoin ethyl ether in 80 ml of 20 percent methyl ethyl ketone in water and dried in the air to provide a coating 5 micrometers thick. The film was exposed through a mask to ultraviolet from a 20 watt black light lamp for 2 minutes. The unexposed areas were readily removed by washing with water, methanol or other common solvent. The presence of Urethane Acrylate I in exposed areas is readily detected by wiping the washed, exposed sheet with a dilute solution of a cationic dye wherein the exposed areas take on the color of the dye. Utility of the urethane acrylates of the invention as a resist material is illustrated by the fact that the copper sheet bearing the water developed image is undamaged by immersion into a Woods metal bath (this is a well known low temperature melting alloy of bismuth and a mixture of other metals) at 260° C. for at least 30 seconds, is undamaged by a refluxing bath of HCl containing methanol, and will withstand a 30 percent ferric chloride copper etching bath without undercutting.

Preparation of Sulfoester Polyol A

A one liter 3-neck flask was equipped with a mechanical stirrer, a nitrogen purge, and set for vacuum distillation using a round-bottom flask which is cooled with a dry ice/acetone bath for receiving distillate. A Woods metal bath was used to heat the 3-neck flask. Into the 3-neck flask was placed 148 g (0.5 mole) dimethyl 5-sulfiosophthalate, 530 g PCP-0200 (1.0 mole of polycaprolactonediol having a weight average molecular weight of 530 available from Union Carbide Corp.), 0.13 g tetraisopropyl titanate (0.02 percent by weight) as esterification catalyst. Nitrogen purge and agitation were initiated. The contents of the flask were brought to 230° C. and held for 4 hours during which time 50 to 75 percent of methanol condensate was removed. The pressure was reduced to 20 Torr and the temperature increased to 250° C. and held for two hours. The system was then back filled with nitrogen and the low viscosity product removed from the flask while hot. It was found to have a hydroxyl equivalent weight of 650.

EXAMPLE 2-9

Ethenically-unsaturated carbamate esters of sulfoester polyols were prepared by the procedure employed in EXAMPLE 1 using equivalent amounts of polyol and corresponding amounts of isocyanatoalkyl acrylates. The particular polyol and isocyanatoalkyl acrylate used to make the isocyanatoalkyl acrylate are given in TABLE I. Also given in TABLE I are the acrylic functionality and calculated acrylic equivalent weight of each urethane acrylate.

black light at a distance of 8.9 cm (3.5 inches) for 5 minutes. The unexposed areas of the coating were readily removed by washing with water or aqueous methanol leaving a deep blue colored, tough abrasion-resistant coating of insoluble polymer in the exposed areas.

EXAMPLE 11

A coating composition was prepared as described in EXAMPLE 1 and TABLE I from 20 g Carbamate Acrylate II, 2.0 g poly(vinyl pyrrolidone) available from GAF Corp., and 0.05 g Methyl Violet 2B Base (as image indiator) in 80 ml of 20 percent methyl ethyl ketone in water. 0.4 g of 2,4-bis(trichloromethyl)-6-(4-methoxystyryl)-s-triazine (as disclosed in U.S. Pat. No. 3,954,475) was used as a photoinitiator. This composition was coated on grained anodized aluminum using a squeeze roll coater and then dried. A coating weight of about 1.7 g per square meter was obtained. The coating was exposed in a vacuum frame to a carbon arc for 40 seconds through a neutral density filter and a negative. It was developed by wiping with aqueous methanol.

Various modifications and alterations of this invention will become apparent to those skilled in the art without departing from the scope and spirit of this invention, and it should be understood that this invention is not to be unduly limited to the illustrative embodiments set forth herein.

I claim:

1. A sulfocompound which is the poly(ethylenically-unsaturated ester or amide) of a sulfopolyol or sulfopolyamine comprising the reaction product of:
   a. a sulfopolyol or sulfopolyamine which is the reaction product of
      (1) one mole of a sulfodicarboxylic acid and
      (2) two moles of an aliphatic polyol or polyamine having two or more hydroxyl or amine groups

TABLE I

| Ex. no. | Carbamate acrylate | Acrylic functionality | Acrylic equivalent weight | Polyol[a] | Isocyanatoalkyl acrylate |
|---|---|---|---|---|---|
| 2 | II | 6 | 295 | PCP TM 0210[b] | TDI[c]/pentaerythritol triacrylate |
| 3 | III | 6 | 260 | Carbowax TM 600[d] | TDI/pentaerythritol triacrylate |
| 4 | IV | 2 | 655 | Polymeg TM 1000[e] | 2-isocyanatoethyl methacrylate |
| 5 | V | 2 | 230 | trimethylene glycol | 2-isocyanatoethyl methacrylate |
| 6 | VI | 12 | 290 | PCP TM 0300[f] | MDI[g]/pentaerythritol triacrylate |
| 7 | VII | 8 | 410 | PCP TM 0300 | MDI/trimethylolpropane diacrylate |
| 8 | VIII | 2 | 940 | Polymeg TM 650[h] | 2-isocyanatoethyl methacrylate |
| 9 | IX | 18 | 100 | pentaerythritol | TDI/pentaerythritol triacylate |
| 10 | X | 18 | 200 | Jeffamine TM D-400[i] | TDI/pentaerythritol triacrylate |

[a] the polyol from which the sulfoesterpolyol was prepared by reaction of two moles of the listed polyol and one mole of dimethyl 5-sulfoisophthalate
[b] polycaprolactonediol having a molecular weight of 830 available from Union Carbide Corp.
[c] toluene diisocyanate, one mole of which was reacted with one mole of pentaerythritol triacrylate to form the isocyanatoalkyl acrylate
[d] poly(oxyethylene)diol having a molecular weight of 600 available from Union Carbide Corp.
[e] poly(oxytetramethylene)diol having a molecular weight of 1000 available from Quaker Oats Co.
[f] polycaprolactonetriol having a molecular weight of 540 available from Union Carbide Corp.
[g] bis(4-isocyanatophenyl)methane
[h] poly(oxytetramethylene)diol having a molecular weight of 650 available from Quaker Oats Co.
[i] polyoxypropylene triamine having a molecular weight of about 400

EXAMPLE 10

Coating compositions of each Carbamate Acrylate II-IX were prepared in accordance with the procedure of EXAMPLE 1. To each composition was added 0.1 g of Methyl Violet 2 B Base and the composition was coated onto 75 μm sheets of biaxially stretched poly(ethylene terephthalate) and dried in the air to provide a coating 5 micrometers thick. Each coating was exposed through a mask to ultraviolet light from a 20 watt attached to a saturated linear chain of up to about 55 carbon atoms in units of 2 to 12 —$CH_2$— groups separated by 0 to 22 —O— atoms and 0 to 8

groups, the polyol and polyamine having a molecular weight of less than 1000 and (c+1) hydroxyl or amino groups (in which c is an integer of 1, 2, or 3); and b. 2 c moles of either (1), (2), or (3), in which
  (1) is a compound selected from
   (a) 2-alkenylazlactones having the formula $$\underset{\underset{R}{|}}{H_2C}=C-C\underset{O-C}{\overset{N-R^1}{\diagup}}\underset{\underset{O}{\parallel}}{\overset{R^2}{C}}\overset{}{\diagdown}R^3 \qquad I$$

wherein
   R is hydrogen or methyl;
   $R^1$ is a covalent bond, $-CH_2-$ or $-CH_2CH_2-$,
   $R^2$ and $R^3$ are independently hydrogen or methyl; and
   (b) ethylenically-unsaturated isocyanates having the formula $$\underset{\underset{R}{|}}{H_2C}=C-R^4-NCO \qquad II$$

wherein
   $R^4$ is a covalent bond, $-CH_2-$, $$-\overset{O}{\overset{\parallel}{C}}O-R^5-, \quad -CH_2O\overset{O}{\overset{\parallel}{C}}NH-R^6-, \quad \text{or}$$

$$-\overset{O}{\overset{\parallel}{C}}O-R^5-O\overset{O}{\overset{\parallel}{C}}NH-R^6-$$

wherein
   $R^5$ is a linear or branched chain of 1 to 12 carbon atoms which can contain one catenary oxygen atom or $$-\overset{O}{\overset{\parallel}{C}}NH$$

group or $R^5$ is a 5- or 6-membered carbocyclic group which is unsubstituted or substituted by lower alkyl groups having 1 to 4 carbon atoms, the carbocyclic group having a total of up to 12 carbon atoms, and
   $R^6$ is an organic group selected from linear or branched alkylene groups having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group being unsubstituted or substituted by up to four lower alkyl groups having 1 to 4 carbon atoms and a total of up to 15 carbon atoms; or (2) a diisocyanate having the formula $$OCN-R^6-NCO, \qquad III$$

the reaction product of said sulfopolyester polyol and said diisocyanate then being reacted with 2 c moles of an ethylenically-unsaturated alcohol having the formula $$\left(\underset{\underset{R}{|}}{H_2C}=C-R^7\right)_{\!a}\!\!-R^8-OH \qquad IV$$

wherein
  R and $R^6$ are as defined above;
  $R^7$ is $$-\overset{O}{\overset{\parallel}{C}}O- \quad \text{or} \quad -\overset{O}{\overset{\parallel}{C}}NH-;$$

$R^8$ is a polyvalent aliphatic group selected from linear and branched alkyl groups having a valence of (a+1), 2 to 12 carbon atoms which can contain one nonperoxidic catenary oxygen atom or one $$-\overset{O}{\overset{\parallel}{C}}HN-$$

group, and alicyclic groups having a 5- or 6-atom carbocyclic structure which is unsubstituted or substituted by up to 4 lower alkyl groups having 1 to 4 carbon atoms and a total of up to 12 carbon atoms; and
  a is an integer of 1, 2, or 3; or (3) the reaction product of one mole of organic diisocyanate of Formula III and one mole of an ethylenically-unsaturated alcohol of Formula IV; there being essentially no hydroxyl, amino, or isocyanate groups remaining after the reaction of a. with b. (1), b.(2), or b.(3), and the sulfocompound contains a single central sulfo group.

2. The sulfocompound according to claim 1 wherein said polyol is selected from the reaction product of one mole of 5-sulfoisophthalic acid and two moles of a polyol selected from the group consisting of poly(oxytetramethylene)diol, poly(oxyethylene)glycol, polycaprolactonepolyol, and pentaerythritol.

3. The sulfocompound according to claim 1 wherein said dicarboxylic acid is selected from 5-sulfoisophthalic acid, 3-sulfoglutaric acid, and sulfosuccinic acid.

4. The sulfocompound according to claim 1 wherein said polyamine is selected from polyoxypropylene di- and triamines and polyoxyethylene di- and triamines.

5. The sulfocompound having a formula selected from $$(H_2C=\underset{\underset{R}{|}}{C}-R^{11}-X)_{\!c}R^{10}-O\overset{O}{\overset{\parallel}{C}}-\underset{\underset{SO_3M}{|}}{R^9}-\overset{O}{\overset{\parallel}{C}}O-R^{10}(X-R^{11}-\underset{\underset{R}{|}}{C}=CH_2)_c \qquad VI$$

and

-continued

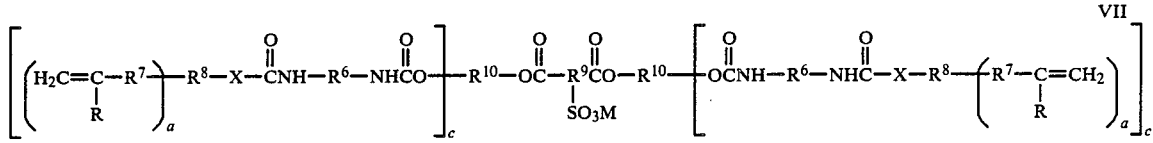

wherein:

R is hydrogen or methyl;

$R^6$ is an organic group selected from linear or branched alkylene groups having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group being unsubstituted or substituted by up to four lower alkyl groups having 1 to 4 carbon atoms and a total of up to 15 carbon atoms;

$R^7$ is

$R^8$ is a polyvalent aliphatic group selected from linear and branched alkyl groups having a valence of (a+1), 2 to 12 carbon atoms which can contain one nonperoxidic catenary oxygen atom or one

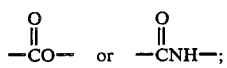

group, and alicyclic groups having a 5-or 6-atom carboxylic structure which is unsubstituted or substituted by up to 4 lower alkyl groups having 1 to 4 carbon atoms and a total of up to 12 carbon atoms;

c is an integer of 1, 2, or 3;

$R^9$ is an arenetriyl group (trivalent arene group) having 6 to 12 carbon atoms or an alkanetriyl (trivalent alkane group) group having 2 to 12 carbon atoms remaining after the removal of carboxyl and sulfo groups from sulfoarene- and sulfoalkane dicarboxylic acids having the formula

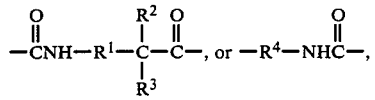

in which M is a cation;

$R^{10}$ is a linear aliphatic group having a valence of (c+1) consisting of a saturated chain of up to about 55 carbon atoms in units of 2 to 12 —CH$_2$— groups separated by 0 to 22 —O— atoms and 0 to 8

$$-O\overset{O}{\underset{\|}{C}}-$$

groups, the aliphatic group having a molecular weight of less than 1000, wherein c is an integer having a value of 1, 2, or 3;

$R^{11}$ is $$-\overset{O}{\underset{\|}{C}}NH-R^1-\overset{R^2}{\underset{R^3}{C}}-\overset{O}{\underset{\|}{C}}-, \text{ or } -R^4-NH\overset{O}{\underset{\|}{C}}-,$$

in which $R^1$ is a covalent bond, —CH$_2$— or —CH$_2$CH$_2$—,
$R^2$ and $R^3$ are independently hydrogen or methyl;
$R^4$ is a covalent bond, —CH$_2$—, $$-\overset{O}{\underset{\|}{C}}O-R^5-, \quad -CH_2O\overset{O}{\underset{\|}{C}}NH-R^6-, \quad \text{or}$$

$$-\overset{O}{\underset{\|}{C}}O-R^5-O\overset{O}{\underset{\|}{C}}NH-R^6-$$

wherein $R^5$ is a linear or branched chain of 1 to 12 carbon atoms which can contain one catenary oxygen atom or $$-\overset{O}{\underset{\|}{C}}NH$$

group or $R^5$ is a 5- or 6-membered carbocylic group which is unsubstituted or substituted by lower alkyl groups having 1 to 4 carbon atoms, the carbocyclic group having a total of up to 12 carbon atoms, $R^6$ is as defined above, X is —O— or —NH—; and a is an integer having a value of 1, 2, or 3.

6. The sulfocompound according to claim 5 wherein $R^4$ is $$-\overset{O}{\underset{\|}{C}}O-R^5-,$$

$R^{10}$ is derived from a polycaprolactonepolyol or polyoxyalkylene-polyol having a molecular weight of up to 1000, and $R^9$ is an arenetriyl group.

7. The sulfocompound according to claim 5 wherein said diisocyanate from which $R^6$ is derived is selected from toluene diisocyanate, isophorone diisocyanate, and bis(4-isocyanatophenyl)methane.

8. The sulfocompound according to claim 5 in which $R^8$ is a group selected from

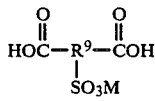

-continued

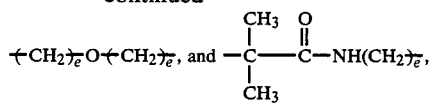, and 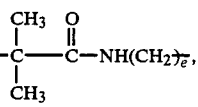

wherein e is an integer of 1 to 4 inclusively.

9. The sulfocompound according to claim 1, wherein $R^8$ is selected from

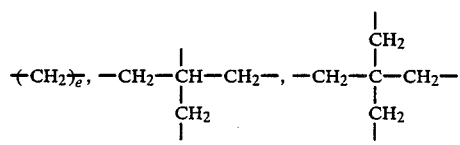

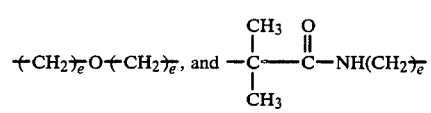, and 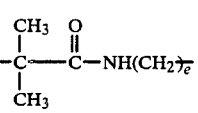

10. A sulfocompound which is the poly(ethylenically-unsaturated ester or amide) of a sulfopolyol or sulfopolyamine comprising the reaction product of:

a. a sulfopolyol or sulfopolyamine which is the reaction product of
   (1) one mole of a sulfodicarboxylic acid and
   (2) two moles of an aliphatic polyol or polyamine having two or more hydroxyl or amine groups attached to a saturated linear chain of up to about 55 carbon atoms in units of 2 to 12 —CH$_2$— groups separated by 0 to 22 —O— atoms and 0 to 8

groups, the polyol and polyamine having a molecular weight of less than 1000 and (c+1) hydroxyl or amino groups (in which c is an integer of 1, 2, or 3); and b. 2 c moles of either (1), (2), or (3), in which
   (1) is a compound selected from
      (a) 2-alkenylazlactones having the formula

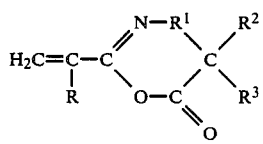   I wherein
R is hydrogen or methyl;
$R^1$ is a covalent bond, —CH$_2$— or —CH$_2$CH$_2$—,
$R^2$ and $R^3$ are independently hydrogen or methyl; and
   (b) ethylenically-unsaturated isocyanates having the formula

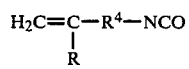   II wherein
$R^4$ is a covalent bond, —CH$_2$—,

, or

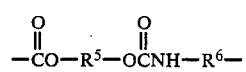

wherein
$R^5$ is a linear or branched chain of 1 to 12 carbon atoms which can contain one catenary oxygen atom or

group or $R^5$ is a 5- or 6-membered carbocyclic group which is unsubstituted or substituted by lower alkyl groups having 1 to 4 carbon atoms, the carbocyclic group having a total of up to 12 carbon atoms, and
$R^6$ is an organic group selected from linear or branched alkylene groups having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group being unsubstituted or substituted by up to four lower alkyl groups having 1 to 4 carbon atoms and a total of up to 15 carbon atoms; or (2) a diisocyanate having the formula

OCN—$R^6$—NCO,   III the reaction product of said sulfopolyester polyol and said diisocyanate then being reacted with 2 c moles of an ethylenically-unsaturated alcohol having the formula

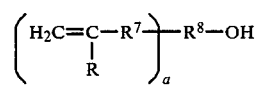   IV wherein
R and $R^6$ are as defined above;
$R^7$ is

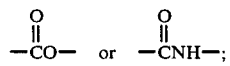;

$R^8$ is a polyvalent aliphatic group selected from linear and branched alkyl groups having a valence of (a+1), 2 to 12 carbon atoms which can contain one nonperoxidic catenary oxygen atom or one

group, and alicyclic groups having a 5- or 6-atom carbocyclic structure which is unsubstituted or substituted by up to 4 lower alkyl groups having 1 to 4 carbon atoms and a total of up to 12 carbon atoms, and a is an integer of 1, 2, or 3; or (3) the reaction product of one mole of organic diisocyanate of Formula III and one mole of an ethylenically-unsaturated alcohol of Formula IV; providing that at least one of a and c is equal to 2 or 3, and there being essentially no hydroxyl, amino, or isocyanate groups remaining after the reaction of a. with b.(1), b.(2), or b.(3).

11. The sulfocompound which is the reaction product of:
a. a sulfopolyol which is the reaction product of
 (1) 1 mole of dimethyl 5-sulfoisophthalate, and
 (2) 2 moles of polycaprolactonediol, and
b. 2 moles of bis(4-isocyanatophenyl)methane;
the reaction product of a. and b. then being reacted with 2 moles of pentaerylthrytol triacrylate.

* * * * *

UNITED STATES PATENT AND TRADEMARK OFFICE
CERTIFICATE OF CORRECTION

PATENT NO. : 4,558,149

DATED : December 10, 1985

INVENTOR(S) : Wayne K. Larson

It is certified that error appears in the above—identified patent and that said Letters Patent is hereby corrected as shown below:

Claim 8 (Column 17, line 7), delete "4" and insert therefor -- 6 --.

Claim 1 (Column 14, line 7), delete "sulfopolyester polyol" and insert therefor -- sulfopolyol or sulfopolyamine --.

Claim 10 (Column 18, line 38), delete "sulfopolyester polyol" and insert therefor -- sulfopolyol or sulfopolyamine --.

Signed and Sealed this

Seventeenth Day of November, 1987

Attest:

DONALD J. QUIGG

*Attesting Officer*   *Commissioner of Patents and Trademarks*